United States Patent

Umebayashi et al.

[11] Patent Number: 5,055,098
[45] Date of Patent: Oct. 8, 1991

[54] AUTOMATIC POWER TRANSMISSION WITH MECHANISM FOR ESTABLISHING UNDER-DRIVE SPEED RATIO AND BEARING STRUCTURE THEREFOR

[75] Inventors: Shigeto Umebayashi, Shizuoka; Kazuyoshi Iwanaga; Noboru Hattori, both of Kanagawa, all of Japan

[73] Assignees: Nissan Motor Company, Limited, Kanagawa; Jatco Corporation, Shizuoka, both of Japan

[21] Appl. No.: 454,960

[22] Filed: Dec. 22, 1989

[30] Foreign Application Priority Data

Dec. 26, 1988 [JP] Japan .................................. 63-330496

[51] Int. Cl.$^5$ .......................... F16H 47/08; F16H 1/28
[52] U.S. Cl. .......................................... 475/312; 475/8; 475/59
[58] Field of Search ............... 475/271, 284, 285, 311, 475/312, 316, 323, 324, 327, 328, 346, 347, 8, 56, 59, 71, 205

[56] References Cited

U.S. PATENT DOCUMENTS

| | | | |
|---|---|---|---|
| 2,764,904 | 10/1956 | Kümmich | 475/285 X |
| 3,494,223 | 2/1970 | Mori | 475/56 X |
| 3,554,057 | 1/1971 | Michnay et al. | 475/59 |
| 4,114,478 | 9/1978 | Clauss | 475/312 X |
| 4,226,123 | 10/1980 | Croswhite | 475/56 |
| 4,438,663 | 5/1984 | Eichenberger et al. | 475/347 X |
| 4,716,786 | 1/1988 | Sakakibara | 74/695 |
| 4,825,725 | 5/1989 | Premiski et al. | 475/285 X |

FOREIGN PATENT DOCUMENTS

| | | |
|---|---|---|
| 0080082 | 6/1983 | European Pat. Off. . |
| 17251 | 2/1983 | Japan .................................. 475/285 |

Primary Examiner—Allan D. Herrmann
Assistant Examiner—Khoi Q. Ta
Attorney, Agent, or Firm—Ronald P. Kananen

[57] ABSTRACT

An automatic power transmission includes a clutch drum integrally connected with an one-way clutch which is fixed to a support secured on a transmission casing so that each one bearing is required for supporting the clutch drum and the one-way clutch. A sun gear is also supported by means of a single bearing and is integrally formed with a spline which is loosely engageable with a spline of the clutch drum so that the radial force may not act in the spline engagement while an engine output torque is transmitted therethrough.

4 Claims, 5 Drawing Sheets

FIG. 4

| | REV/C | H/C | FWD/C | OVR/C | L&R/B | LOW O.W.C | FWD O.W.C | B/B | D/C | RDCN/B | RDCN O.W.C | S/A | S/R | OD S/A |
|---|---|---|---|---|---|---|---|---|---|---|---|---|---|---|
| 1ST | | | ○ | ⊗ | ○ | ▨ | ▨ | | | ○ | ▨ | | | |
| 2ND | | ○ | ○ | ◎ | | | ▨ | ○ | | ○ | ▨ | ○ | | |
| 3RD | | ○ | ○ | ◎ | | | ▨ | | ○ | ○ | ▨ | ⊗ | ○ | |
| 4TH | | ○ | ○ | ◎ | | | ▨ | ○ | ○ | | | ⊗ | ○ | |
| 5TH | | | ⊗ | | | | | | | | | ⊗ | ⊗ | ○ |
| REV | ○ | | | | ○ | | | | | ○ | | | | |

○ : ENGAGED

◎ : TO BE ENGAGED AT LESS THAN OR EQUAL TO 1/16 OF THROTTLE OPEN ANGLE FOR ENGINE BRAKING

▨ : EFFECTIVE DURING ACCELERATION

⊗ : NOT EFFECTIVE THOUGH ENGAGED

⊗ : TO BE ENGAGED AT LESS THAN OR EQUAL TO 1/16 OF THROTTLE OPEN ANGLE BUT NOT EFFECTIVE FOR ENGINE BRAKING

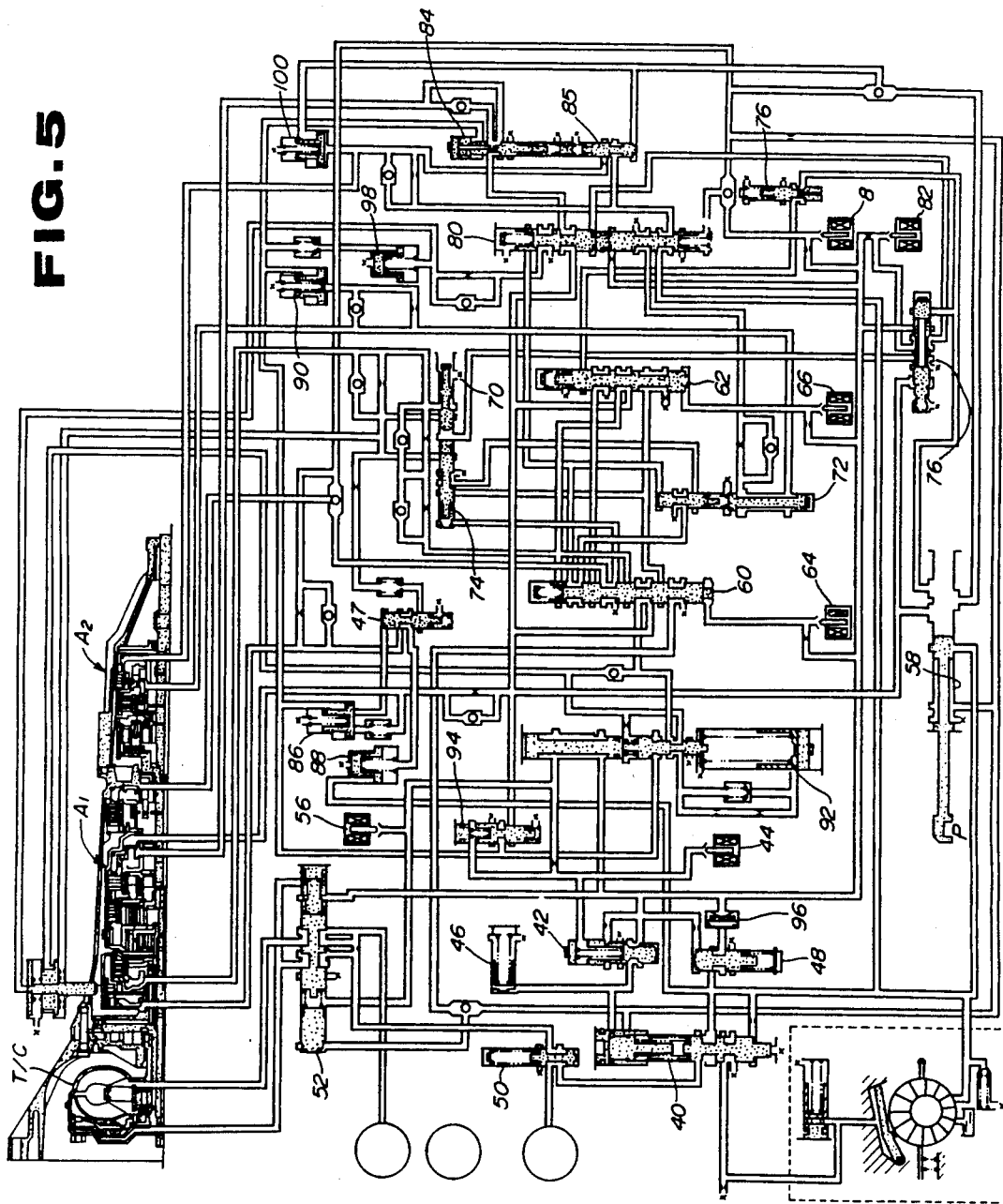

AUTOMATIC POWER TRANSMISSION WITH MECHANISM FOR ESTABLISHING UNDER-DRIVE SPEED RATIO AND BEARING STRUCTURE THEREFOR

BACKGROUND OF THE INVENTION

1. Field of the Invention

The present invention relates generally to an automatic power transmission for an automotive vehicle. More specifically, the invention relates to an automatic power transmission with a mechanism for establishing an under-drive speed ratio which is lower than a first speed ratio. Further particularly, the invention relates to a structure for rotatably supporting friction elements and control element in an under-drive mechanism.

2. Field of the Invention

An automatic power transmission with a subsidiary transmission unit has been disclosed in Japanese Patent First (unexamined) Publication (Tokkai) Showa 61-79068. The shown transmission includes a primary transmission unit and a subsidiary transmission unit. The subsidiary transmission has an additional planetary gear set which includes a ring gear supported on a subsidiary shaft and a pinion carrier receiving input force via the ring gear. A clutch drum is also provided for establishing engagement between the pinion carrier and a sun gear. The clutch drum includes a friction element engageable with the sun gear and another friction element for fixing or anchoring the sun gear onto a subsidiary transmission casing via the clutch drumm and an one-way clutch provided in parallel relationship with the friction elements.

The sun gear is supported on an output shaft via a pair of bearings. The clutch drum is integrally formed with the inner race of the one-way clutch and is supported on a support via a pair of bearings. In addition, a pair of end bearings are provided for centering the outer race of the one-way clutch. A spline member is separately formed from the sun gear, which spline member firmly engages with the spline section of the clutch drum.

With such construction, the pair of bearings becomes necessary for supporting the sun gear on the output shaft so as to prevent swaying of the sun gear and the drum support when the input force is active on the interengaging spline sections. Furthermore, since the long needle bearing cannot be used for supporting the sun gear because of high possibility of seizuring, a plurality of bearing becomes necessary.

Therefore, too many bearings employed in the subsidiary transmission may result in high friction for causing power loss. Furthermore, great number of parts makes the assembling process complicate and costful.

SUMMARY OF THE INVENTION

Therefore, it is an object of the present invention to provide a simplified supporting structure for rotary element or elements, friction element in an automotive power transmission.

In order to accomplish the aforementioned and other objects, an automatic power transmission, according to the present invention, includes a clutch drum integrally connected with a one-way clutch which is fixed to a support secured on a transmission casing so that each one bearing is required for supporting the clutch drum and the one-way clutch. A sun gear is also supported by means of a single bearing and is integrally formed with a spline which is loosely engagable with a spline of the clutch drum so that the radial force may not act in the spline engagement.

According to one aspect of the invention, an automatic power transmission including a plurality of planetary gear sets for establishing predetermined speed ratios, each planetary gear set including a ring gear, a pinion carrier, and a sun gear interposed between the ring gear and the pinion carrier, the ring gear being driven by input torque and the pinion carrier forming output of driving torque, each of the planetary gear set being associated with a clutch drum which is, in turn, associated with an one-way clutch for locking the sun gear onto a transmission casing, a support structure for at least one planetary gear set comprises:

a first bearing supporting the sun gear on an output shaft;

the one-way clutch being provided with an outer race firmly fixed to the clutch drum and an inner race integrated with a support member of the transmission casing, the inner race thus supporting an assembly of the one way clutch and the clutch drum with respect to the support member;

a second bearing supporting the clutch drum at an orientation in the vicinity of the sun gear and remote from the inner race; and a third bearing supporting the outer race of the one-way clutch; the third bearing cooperatings with the second bearing for centering the outer race.

The automatic power transmission may further comprise a first spline member integrally formed with the clutch drum, a second spline formed integrally with the sun gear and means for absorbing axial and radial force to be exerted on the first and second spline member interengaging to each other when the engine output torque is transmitted therethrough. Preferably, the force absorbing means establishes spline engagement with the first spline with axial and radial play.

According to another aspect of the invention, an automatic power transmission including a primary transmission unit variable of operational range over a plurality of predetermined ranges and having a primary transmission casing and a plurality of planetary gear sets for selectively establishing one of the operational ranges, and a subsidiary transmission unit having a subsidiary transmission casing rigidly connected to the primary transmission casing and a subsidiary planetary gear set for establishing an under-drive range speed ratio, which subsidiary transmission unit includes a ring gear, a pinion carrier, and a sun gear interposed between the ring gear and the pinion carrier, the ring gear being driven by input torque and the pinion carrier forming output of driving torque, each of the planetary gear sets being associated with a clutch drum which is, in turn, associated with an one-way clutch for locking the sun gear onto a transmission casing, a support structure for the subsidiary planetary gear set comprises:

a first bearing supporting the sun gear on an output shaft;

the one-way clutch being provided with an outer race firmly fixed to the clutch drum and an inner race rigidly engaged with a support secured onto the transmission casing;

a second bearing supporting the clutch drum at an orientation in the vicinity of the sun gear;

a third bearing supporting the outer race of the one-way clutch;

a first spline member integrally formed with the clutch drum; and a second spline formed integrally with the sun gear and establishing spline engagement with the first spline with axial and radial play.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings:

FIG. 4 is a chart showing active components in the automatic power transmission of FIG. 1, which components are associated to the train of power for establishing respective speed ratios; and FIG. 5 is a diagram showing a hydraulic shift control unit in the preferred embodiment of the automatic power transmission according to the present invention.

DESCRIPTION OF THE PREFERRED EMBODIMENT

Figure 1:
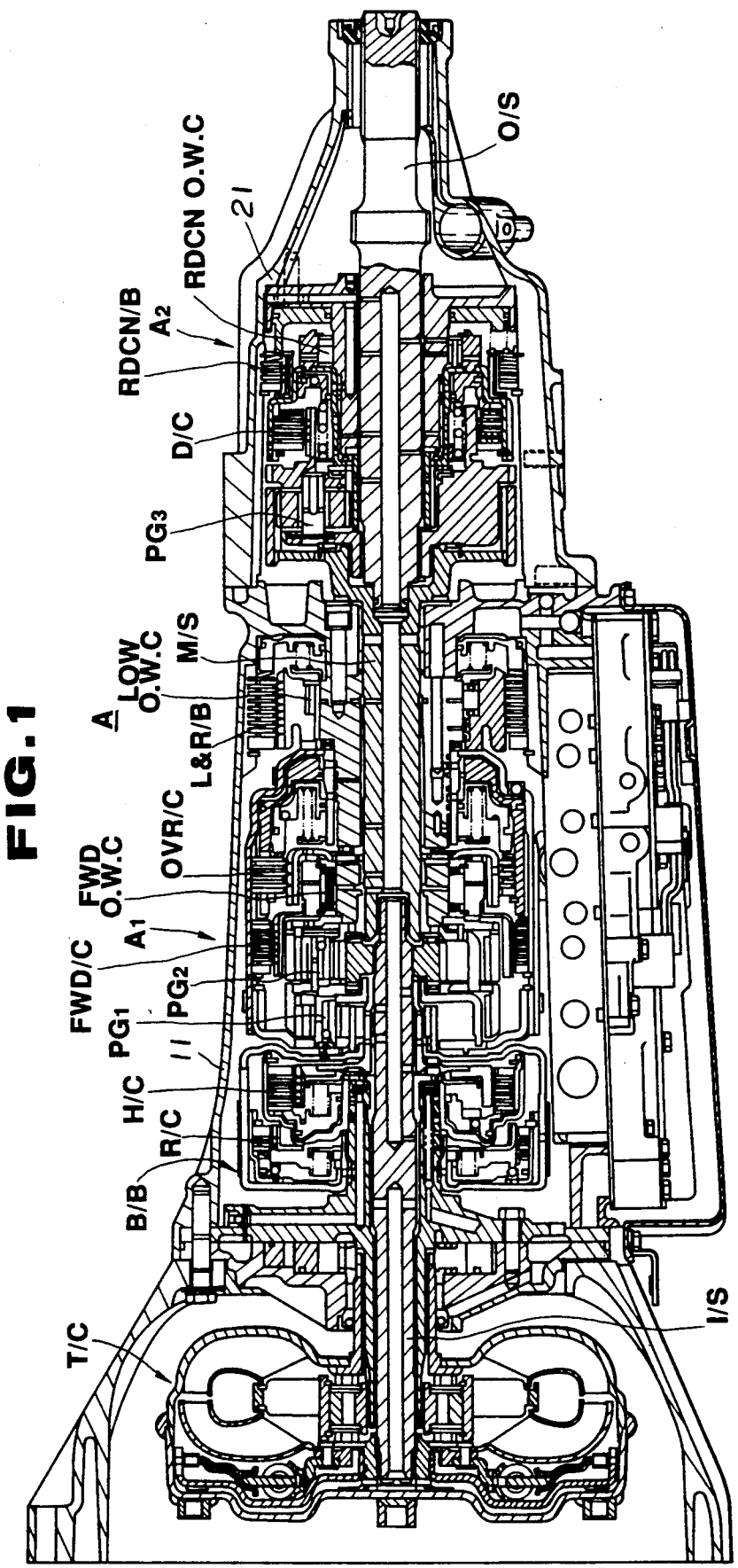
FIG. 1 is a section of the preferred embodiment of a power transmission according to the present invention, which employs primary and subsidiary transmission units for providing capability of selecting of transmission speed ratio over five forward drive speed ratio including under-drive speed ratio lower than a first speed ratio.
Figure 2:
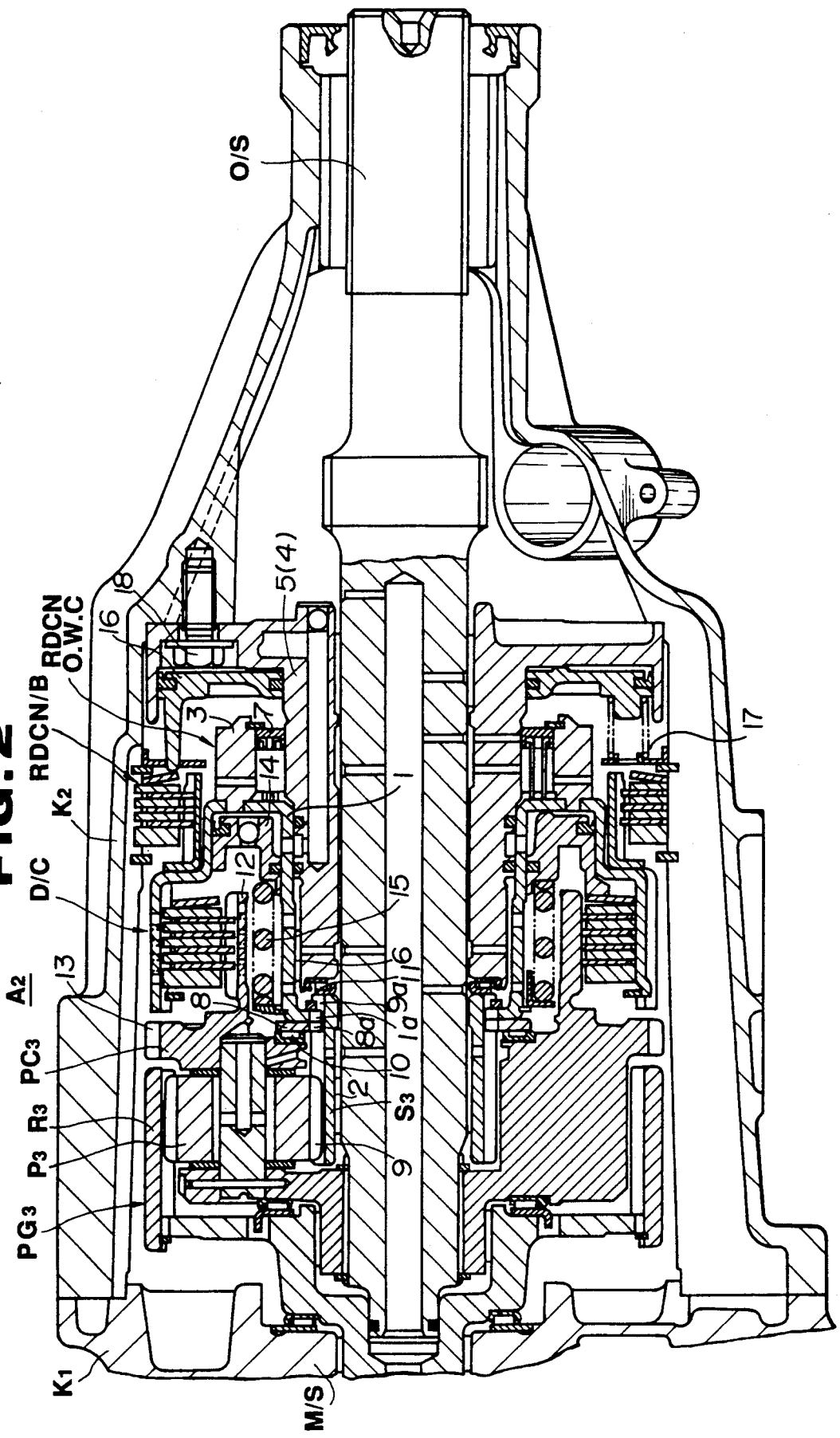
FIG. 2 is an enlarged section of the subsidiary transmission unit in the preferred embodiment of the power transmission.
Figure 3:
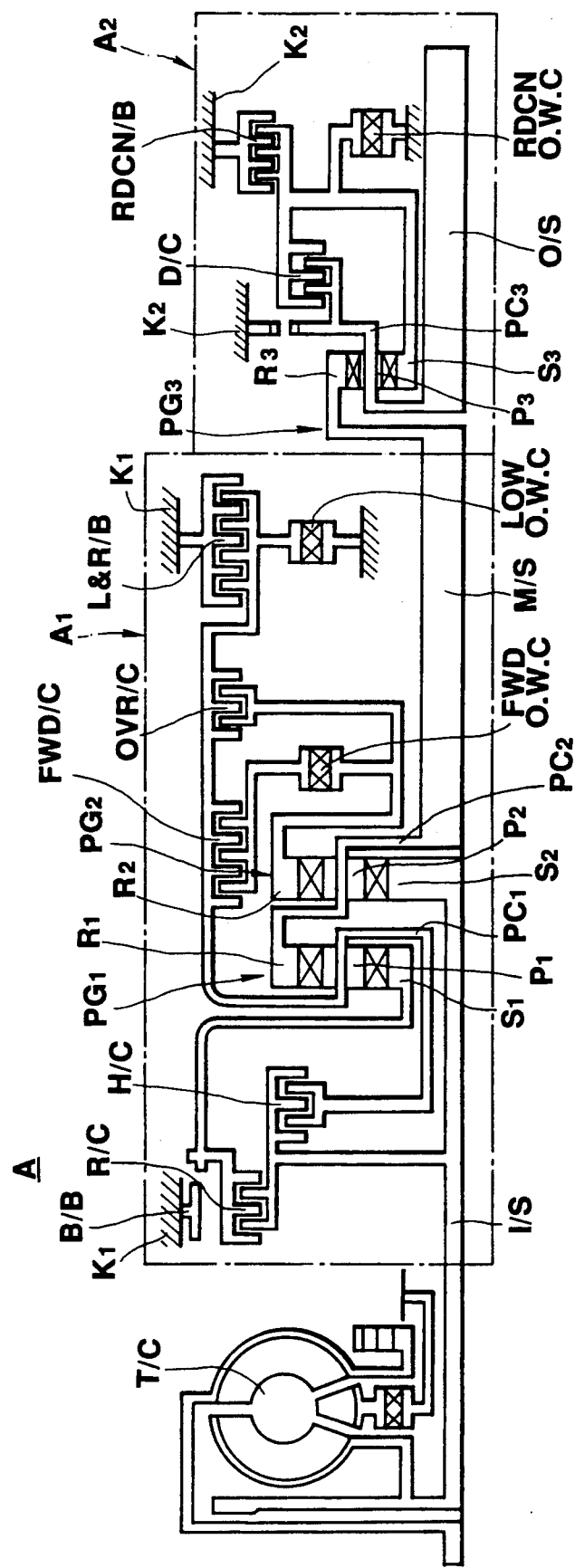
FIG. 3 is a skelton diagram of the preferred embodiment of the power transmission of FIG. 1.

Referring now to the drawings, particularly to FIGS. 1 through 3, the preferred embodiment of an automatic power transmission for an automotive power train, according to the present invention, is designed for establishing five forward drive speed ratios and a single reverse drive gear ratio, which five forward drive speed ratio includes the lowest first speed ratio, a second speed ratio, third speed ratio, fourth speed ratio, and, in addition, an under-drive speed ratio lower than the first speed ratio. The automatic power transmission is further shiftable to P (parking) range position, R (reverse) range position and N neutral range position. The shown embodiment of the power transmission will be represented by the reference sign "A". The automatic power transmission A includes a primary transmission unit $A_1$ and a subsidiary transmission unit $A_2$. The primary transmission unit $A_1$ provides capability of selection of speed ratio for first to fourth forward drive speed ratio. P range, R range and N range. On the other hand, the subsidiary transmission unit $A_2$ provides the under-drive speed ratio.

The automatic power transmission in the shown embodiment, includes a torque converter T/C associated with an output shaft of an internal combustion engine via an input shaft I/S. The torque converter T/C includes a lock-up mechanism for establishing lock-up. The torque converter T/C is housed within a converter casing which is rigidly secured to a casing $K_1$ of the primary transmission unit $A_1$. Also, the subsidiary transmission unit $A_2$ has a casing $K_2$ connected to the primary transmission casing $K_1$ in alignment.

As shown in FIGS. 1 and 3, the primary transmission unit housed within the primary transmission casing $K_1$ includes an input or turbine shaft I/S connected to the output shaft of an automotive internal combustion engine as a prime mover, via a torque converter T/C. The primary transmission unit $A_1$ also includes an intermediate shaft M/S for transmitting driving torque to a final drive. The torque converter T/C has a pump impeller, a turbine runner and a stator. The pump impeller is connected to the engine output shaft. On the other hand, the turbine runner is connected to the input shaft I/S. The pump impeller is also connected to an oil pump for driving the latter. Between the input shaft I/S and the intermediate shaft M/S, a first planetary gear set $PG_1$, a second planetary gear set $PG_2$ a reverse clutch R/C, a high clutch H/C, a forward clutch FWD/C, an overrun clutch OVR/C, low-and-reverse brake L&R/B, a band brake B/B, low one-way clutch LOW O.W.C and forward one-way clutch FWD O.W.C. The torque converter incorporates a lock-up clutch. On the other hand, the first plantary gear set $PG_1$ includes sun gear $S_1$, a ring gear $R_1$, a pinion $P_1$ and a carrier $PC_1$ supporting the planetary gear. The second planetary gear set $PG_2$ includes a sun gear $S_2$, a ring gear $R_2$, a pinion $P_2$ and a carrier $PC_2$ supporting the pinion.

The carrier $PC_1$ supporting the pinion $P_1$ is so designed as to be connectively associated with the input shaft I/S via a high clutch H/C. The carrier $PC_1$ is also connected to the ring gear $R_2$ of the second planetary gear set $PG_2$ via a forward clutch F/C and a forward one-way clutch FWD O.W.C. which is coupled with the forward clutch in series, or in the alternative, via the forward clutch FWD/C and a overrun clutch OVR/C which is provided in parallel to the forward one-way clutch FWD O.W.C. The carrier $PC_1$ is adapted to be anchored by a low and reverse brake L&R/B and its reverse rotation is prevented by the low one-way clutch LOW O.W.C. The sun gear $S_1$ of the first planetary gear set $PG_1$ is so designed as to be connectively associated with the input shaft I/S via a reverse clutch R/C. The sun gear $S_2$ of the second planetary gear set $PG_2$ is constantly connected to the input shaft I/S. The ring gear $R_1$ of the first planetary gear set $PG_1$ and the carrier $PC_2$ of the second planetary gear set $PG_2$ are constantly connected to the intermediate shaft M/S. The ring gear $R_1$ is integrally connected with the carrier $PC_2$ of the second planetary gear set $PG_2$. The sun gear $S_2$ of the second planetary gear set $PG_2$ connected to the input shaft I/S. The ring gear $R_2$ is connectively associated with the carrier $PC_1$ via the overrun clutch OVR/C. In order to establish a predetermined drive relation, the forward one-way clutch FWD O.W.C. and the forward clutch FWD/C are arranged between the carrier $PC_1$ and the ring gear $R_2$ of the second planetary gear set 16. Engagement of the forward clutch F/C causes the forward one-way clutch FWD O.W.C. to connect the ring gear $R_2$ with the carrier $PC_1$ in the reverse rotational direction.

A low and reverse brake L&R/B can fix the carrier $PC_1$. On the other hand, a band brake B/B can fix the sun gear $S_1$. A low one-way clutch LOW O.W.C. permits rotation of the carrier $PC_1$ in a forward direction (same direction to the rotating direction of the engine intermediate shaft M/S) and prevents the carrier $PC_1$ from rotating in reverse direction (opposite to the rotating direction in forward direction).

On the other hand, as shown in FIGS. 1 and 2, the subsidiary transmission unit $A_2$ includes a third planetary gear set $PG_3$ which includes a sun gear $S_3$, a ring gear $R_3$, a pinion $P_3$ and a pinion carrier $PC_3$. The third planetary gear set $PG_3$ of the subsidiary transmission unit $A_2$ is housed within the subsidiary transmission casing $K_2$. A direct clutch D/C, a reduction brake RDCN/B and a reduction one-way clutch RDCN O.W.C. are also housed within the subsidiary transmission casing $K_2$. The reduction brake RDCN/B is arranged in parallel relationship with the reduction one-way clutch RDCN O.W.C. The ring gear $R_3$ is rigidly connected to the intermediate shaft M/S for co-rotation therewith. On the other hand, the sun gear $S_3$ is radially supported on an output shaft O/S via a sun gear bearing 2. The sun gear $S_3$ is associated with the reduction brake RDCN/B so that it can be locked on the subsidiary transmission casing $K_2$ when the latter is applied. The sun gear $S_3$ is connectable with the pinion carrier $DC_3$ via the direct clutch D/C which has a clutch drum 1 provided for co-rotation with the sun gear $S_3$. The clutch durm 1 o f the direct clutch D/C is associated with the reduction brake RDCN/B for locking the sun gear $S_3$ onto the subsidiary transmission casing. On the other hand, the sun gear $S_3$ is associated with the reduction one-way clutch RDCN O.W.C. for to be permitted rotation in forward direction and prevented rotation in the reverse direction.

The reduction one-way clutch RDCN O.W.C. has a outer race 3 is rigidly fixed to the clutch drum 1 of the direct clutch D/C. On the other hand, the inner race 4 of the reduction one-way clutch RDCN O.W.C. is integrally formed with a support 5. The end portion of the clutch drum 1, which end portion is oriented in the vicinity of the sun gear $S_3$, is supported by means of a drum bearing 6. On the other hand, the free end of the outer race 3 is supported by means of an end bearing 7. The clutch drum 1 has the end bent radially inward and formed with spline section $1a$. An attachment plate 8 is secured on the radially extended section of the clutch drum 1. The attachment plate 8 has the splined radial inner end $8a$.

The sun gear $S_3$ has a helical gear teeth 9 with a spline section $9a$ which is formed integrally with the helical gear teeth. Both of the splined radial inner ends $1a$ and $8a$ engage with the spline section $9a$ with a play in axial and radial directions.

In FIG. 2, reference numeral 10 and 11 denote thrust bearings, 12 denotes clutch hub formed integrally with the pinion carrier $PC_3$ of the third planetary gear set $PG_3$, 13 denotes a parking gear integrally formed with the pinion carrier $PC_3$, 14 is a clutch piston, 15 denotes a return spring, 16 denotes a brake piston, 17 denotes a return spring, 18 denote a bolt for securing the support 5 onto the subsidiary transmission casing $K_2$.

In the subsidiary transmission unit $A_2$, the rotary elements which are required to be supported by means of bearings are the sun gear $S_3$, the clutch drum 1 and the reduction one-way clutch RDCN O.W.C. As set forth, the outer race 3 of the reduction one-way clutch RDCN O.W.C. is rigidly secured to the clutch drum 1, and the inner race of the reduction one-way clutch RDCN O.W.C. is secured to the support 5 attached to the subsidiary transmission casing $K_2$. Therefore, the clutch drum 1 associated with the outer race 3 can be supported with respect to the support 5. Also, centering of the reduction one-way clutch RDCN O.W.C. can be done with respect to one side. Therefore, the reduction one-way clutch RDCN O.W.C. also can be supported at one side. Therefore, in the shown construction, the bearings 6 and 7 can perform equivalent supporting performance to a pair of bearings required for the clutch drum and a pair of end bearings required for centering the outer race of the reduction one-way clutch in the prior art.

In addition, since the play in radial and axial direction is provided between the spline section $9a$ axially extending from the sun gear $S_3$ and the spline section $1a$ of the clutch drum 1 of the clutch drum 1, radial direction force may not act on the interengaging spline sections when the engine output power is transmitted therethrough. Therefore, sun gear $S_3$ can be supported by means of a sole bearing 2. Furthermore, since the sun gear $S_3$ is independent of the clutch drum 1 and the reduction one-way clutch RDCN O.W.C., accuracy required in assembling and machining the the clutch drum 1 and the reduction one-way clutch RDCN O.W.C. becomes lower.

The power train as set forth above is selectable of power transmission mode by combination of the states of one or more friction element, i.e. the reverse clutch R/C, the high clutch H/C, forward clutch FWD/C, the overrun clutch OVR/C, the low and reverse brake L&R/B and the band brake B/B, to establish various modes of operation of the components of $S_1$, $S_2$, $S_3$, $R_1$, $R_2$, $R_3$, $PC_1$, $PC_2$ and $PC_3$ of the first, second and third planetary gear sets $PG_1$, $PG_2$ and $PG_3$. With the various modes of operation of the components of the first, second and third planatary gear sets $PG_1$, $PG_2$ and $PG_3$, rotation speed at the intermediate shaft M/S versus of the rotation speed at the input shaft I/S is varied at various rates. Active components at respective operational modes of the transmission are illustrated in FIG. 4. In the table of FIG. 4, gear ratios of sun gears $S_1$, $S_2$ and $S_3$ versus the ring gears $R_1$, $R_2$ and $R_3$. By combination of the gear ratios, the ratio of rotation of the output shaft O/S versus the rotation speed of the input shaft I/S is determined.

The hydraulic system of the shown automatic power transmission, as shown in FIG. 5, is provided hydraulic pressure controlling operation of respective friction elements. The hydraulic system includes a pressure regulator valve 40, a pressure modifier valve 42, a line pressure solenoid 44, a modifier pressure accumulator valve 46, an accumulator shift valve 47, a pilot valve 48, a torque converter relief valve 50, a lock-up control valve 52, a lock-up solenoid 56, a manual selector valve 58, a first shift valve 60, a second shift valve 62, a first shift solenoid 64, a second shift solenoid 66, a 3-2 timing valve 70, a 5-2 relay valve 72, a 5-2 sequence valve 74, a first range reducing valve 76, a shuttle shift valve 78, an overrun clutch control valve 80, an overrun clutch solenoid 82, an overrun clutch reducing valve 84, a reducing timing valve 85, a N-D accumulator 86, a 2-3 accumulator 88, a 3-4 accumulator 90, 1-2 accumulator valve and piston 92, an accumulator control valve 94 and a strainer 96. These shift control components in the hydraulic circuit are essentially the same or similar construction and perform essentially the same or similar functions as that done by the components in an automatic power transmission known as NISSAN Full-Range Automatic Power Transmission Type RE4R-01A. The construction of the hydraulic circuits and function of circuit components have been disclosed in the U.S. Pat. No. 4,680,992, issued on July 21, 1987, to Hayasaki et al. and from "Nissan Full-Range Electronically Controlled Automatic Transmission Service Manual", published by Nissan Motor Co., Ltd., on Mar.

1987. The disclosure of the above-identified publications are herein incorporated for the sake of disclosure. Furthermore, Japanese Patent First (unexamined) Publication (Tokkai) Showa 62-62047 also discloses the hydraulic circuit similar to that illustrated in FIG. 3. The disclosure of this Japanese publication is herein incorporated by reference for the sake of disclosure.

In addition to the components set forth above, a 4-5 accumulator 98 and a reduction brake accumulator 100 are provided. The shown circuit structure has been somewhat modified from that disclosed in the above-identified publication in some aspect. The modified hydraulic circuit has been disclosed in Service Manual No. 626 (YA1-3. YA1B) "NISSAN CEDRIC, GLORIA, Introduction to Modification of Y31 type series" pages C-22 to C-35, issued in June, 1989, by Nissan Motor Co., Ltd. The disclosure of this publication is herein incorporated by reference for the sake of disclosure.

The pressure regulator valve 40 adjusts a line pressure by modulating the source pressure from the oil pump depending upon a driving condition. The pressure modifier valve 42 serves for assisting the pressure regulator valve 40 and adjusts signal pressure (modifier pressure) for providing adjusting line pressure depending upon the driving condition. The modifier accumulator valve 46 removes pulsation of the line pressure by smoothing the pressure modifier pressure supplied from the pressure modifier valve 42. The pilot valve 48 produces a pilot pressure for controlling line pressure, lock-up of torque converter, overrun clutch, 3-2 timing valve and so forth. The accumulator control valve 94 controls back pressure according to the driving condition. The manual selector valve 58 is associated with a manually operable selector lever and shiftable according to selector lever position for selectively distributing the line pressure for corresponding friction elements set forth above. The first and second shift valves 60 and 62 are associated with the first shift solenoid 64 for simultaneously switching connection of three lines for controlling shifting operation between first, second, third and fourth speed ratios through both the second chamber and a fourth speed servo apply chamber. With this construction, when second speed pressure is supplied to the second speed servo apply chamber, the band brake (B/B) 28 is applied; when the third speed pressure is supplied to the third speed servo release chamber, the band brake is released; and when the fourth speed pressure is supplied to the fourth speed servo apply chamber, the band brake is applied. The shuttle valve selectively provides pressure for 3-2 timing control and overrun clutch control depending upon accelerator position. Furthermore, the second shuttle valve further the disables overrun clutch for prevention of interlocking at fourth speed ratio while a throttle valve open angle is large. The overrun clutch control valve 80 serves for switching lines in order to prevent the overrun clutch from being activated while the band brake is active at the fourth speed ratio. The 4-2 relay valve 72 stores the state of driving at the fourth speed ratio and cooperates with the 4-2 sequence valve and the first and second shift valves for preventing fourth speed ratio to third speed ratio upon 4-2 down-shifting. The 4-2 sequence valve 74 prevents the band servo pressure from being drained during 4-2 shifting operation until the high clutch operating pressure and the band servo release pressure us being drained. The servo charger valve 68 is active at the third and fourth speed ratios for supplying band servo operating pressure for second speed ratio for enabling 4-2 and 3-2 down-shifting. The 3-2 timing valve 70 temporarily provides a neutral state for providing a delay for draining of band servo release upon 3-2 down-shifting when the vehicular speed is higher than a predetermined speed. The overrun clutch reducing valve 84 reduces operating pressure for the overrun clutch for reducing shock at initiation of engine braking. The torque converter release valve 50 prevents the torque converter pressure from becoming excessive. The lock-up control valve 52 controls lock-up activated state and deactivated state for providing smooth transition.

In the shown construction, an apply chamber and a release chamber are defined in the torque converter T/C in order to control the state of the lock-up clutch. Namely, when the fluid pressure is supplied to the release chamber, the lock-up clutch is released and when the fluid pressure is supplied to the apply chamber, lock-up clutch is engaged for establishing lock-up condition. The band brake B/B defines a second speed servo apply chamber, a third speed servo release chamber and a fourth speed servo apply chamber. With this construction, when second speed pressure is supplied to the second speed servo apply chamber, the band brake B/B is applied; when the third speed pressure is supplied to the third speed servo release chamber, the band brake is released; and when the fourth speed pressure is supplied to the fourth speed servo apply chamber, the band brake is applied.

In addition to the components set forth above, the shown embodiment of the hydraulic circuit of the automatic power transmission incorporates a variable displacement vane-type oil pump 34 associated with a feedback accumulator 32. The hydraulic circuit further comprises an oil cooler 36, a front side lubricant line 37 and a back side lubricant line 38.

With the shown construction of the hydraulic circuit, the transmission can be operated to various range positions as illustrated in FIG. 4.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, though the shown embodiment is directed to the supporting structure of the sun gear and other elements in the subsidiary transmission, the similar construction may be applicable for supporting sun gear and associated elements in the over-drive mechanism (4th range) of the primary transmission. Furthermore, the similar supporting structure may be applicable for a laterally mounted type transmission which has parallel shafts.

What is claimed is:

1. An automatic power transmission including a plurality of planetary gear sets for establishing predetermined speed ratios, each planetary gear set including a ring gear, a pinion carrier, and a sun gear interposed between said ring gear and said pinion carrier, said ring gear being driven by input torque and said pinion carrier forming output of driving torque, each of said planetary gear sets being associated with a clutch drum which is, in turn, associated with a one-way clutch for locking said sun gear onto a transmission casing, a support structure for at least one planetary gear set comprising:

a first bearing supporting said sun gear on an output shaft;

said one-way clutch being provided with an outer race fixed to said clutch drum and an inner race integrated with a support member of the transmission casing, said inner race thus supporting an assembly of said one way clutch and said clutch drum with respect to said support member;

a second bearing supporting said clutch drum at an orientation in the vicinity of said sun gear and remote from said inner race; and a third bearing supporting said outer race of said one-way clutch, said third bearing cooperating with said second bearing for centering said outer race.

2. An automatic power transmission as set forth in claim 1, which further comprises a first spline member integrally formed with said clutch drum, a second spline formed integrally formed with said sun gear and means for absorbing axial and radial force to be exerted on said first and second spline member interengaging to each other when the engine output torque is transmitted therethrough.

3. An automatic power transmission as set forth in claim 2, wherein said means for absorbing axial and radial force establishes spline engagement between said first spline member and said second spline while allowing axial and radial play.

4. An automatic power transmission including a primary transmission unit variable of operational range over a plurality of predetermined ranges and having a primary transmission casing and a plurality of planetary gear sets for selectively establishing one of said operational ranges, and a subsidiary transmission unit having a subsidiary transmission casing rigidly connected to said primary transmission casing and a subsidiary planetary gear set for establishing an under-drive range speed ratio, which subsidiary transmission unit includes a ring gear, a pinion carrier, and a sun gear interposed between said ring gear and said pinion carrier, said ring gear being driven by input torque and said pinion carrier forming output of driving torque, each of said planetary gear set being associated with a clutch drum which is, in turn, associated with a one-way clutch for locking said sun gear onto a transmission casing, a support structure for said subsidiary planetary gear set comprising:

a first bearing supporting said sun gear on an output shaft;

said one-way clutch of being provided with an outer race fixed to said clutch drum and an inner race rigidly engaged with a support secured onto the transmission casing;

a second bearing supporting said clutch drum at an orientation in the vicinity of said sun gear;

a third bearing supporting said outer race of said one-way clutch;

a first spline member integrally formed with said clutch drum; and a second spline formed integrally formed with said sun gear and establishing spline engagement with said first spline while allowing axial and radial play.

* * * * *